United States Patent Office 3,134,429
Patented May 26, 1964

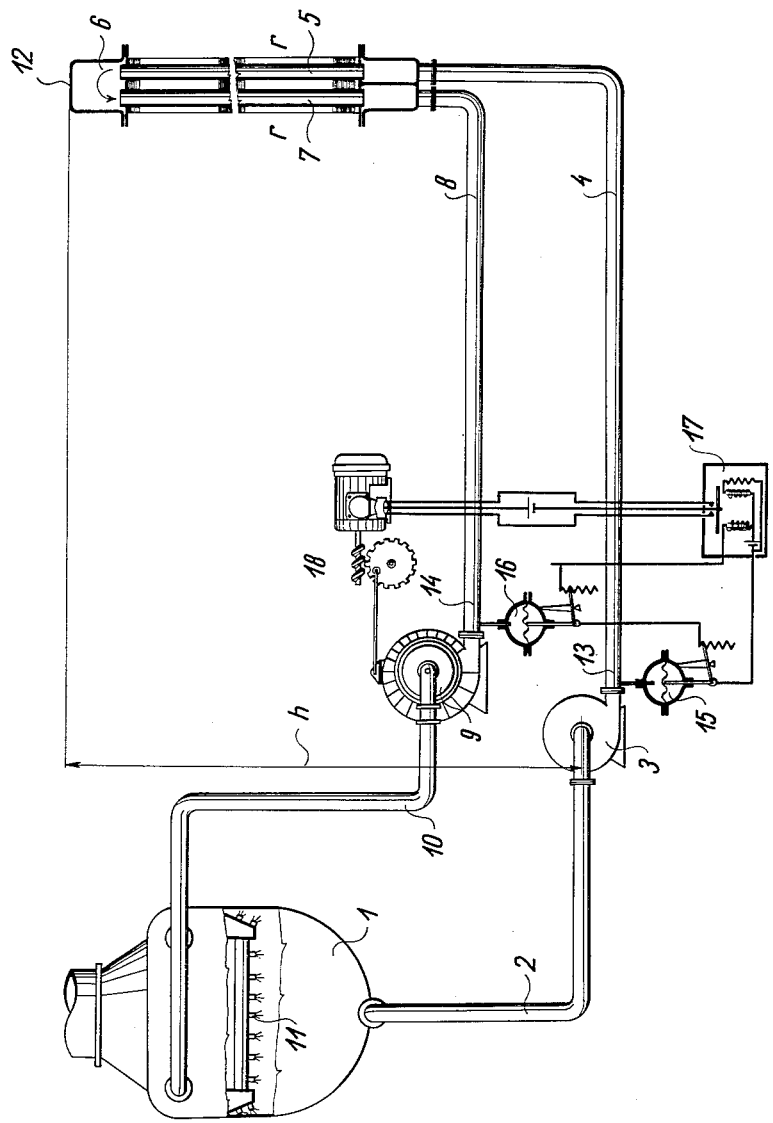

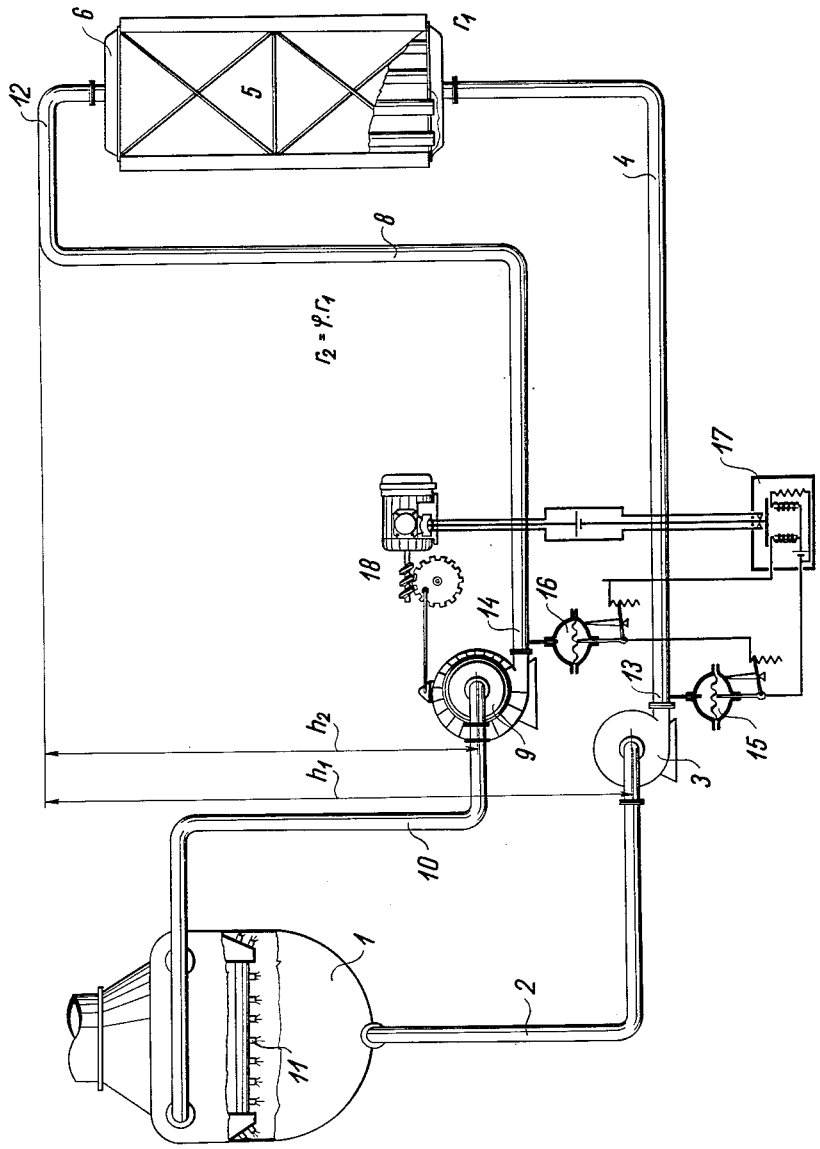

3,134,429
MEANS FOR ADJUSTING THE PRESSURE OF
AIR-COOLED CONDENSATION APPARATUS
László Heller, László Forgó, and Pál Erdösi, Budapest,
Hungary, assignors to Licencia Talalmanyokat Erteke-
sito Vallalat, Budapest, Hungary
Filed Jan. 27, 1961, Ser. No. 85,340
3 Claims. (Cl. 165—40)

This invention relates to means for adjusting the pressure prevailing in air-cooled condensation apparatus.

Air-cooled condensation apparatus consisting of a mixing condenser downstream of a steam turbine and of an air-cooled heat exchanger are already known. In such apparatus, the cooling water which is then of the same quality as the condensate is circulated from the mixing condenser through pipe systems of heat exchangers back to the mixing condenser by means of a pump. It is also known to prevent that in such apparatus air enter the system upon leakage or unexpected breakdowns or failures. A pressure superior to the atmospheric one is maintained everywhere between the pressure stub of the circulating pump and a pressure maintaining device downstream the heat exchangers. Such pressure maintaining device consists either in a valve of suitable construction or in a water turbine by which, in case of high output apparatus, the potential energy associated with the pressure increase effected and maintained by the circulating pump is exploited with respect to the vacuum prevailing in the mixing condenser. Obviously, the pressure maintaining device such as a water turbine has to be adjusted so that the desired overpressure be warranted in the whole of the system by such adjustment. As is likewise known, due to the structure of practically suitable heat exchangers the flow of the cooling water circulated therein takes place in a vertical direction. Thus, the cooling water flows, e.g. from the bottom upwards to the top level of the heat exchangers where it is reversed and flows downwards likewise in a vertical direction so as to regain the mixing condenser and the pressure-adjusting device, respectively. In such cases, the minimum static pressure prevailing in the system is always to be found at the highest geodetic level thereof and, therefore, a practical adjustment consists in providing the pressure-adjusting devices with a control impulse derived dependent on the pressure prevailing at the highest geodetic level of the system comprising the heat exchangers.

An obvious expedient of such adjustment would consist in adjusting e.g. the inlet of the aforesaid water turbine by means of a pipe conduit which connects the highest geodetic level of the heat exchanger system with the inlet of the water turbine and supplies the desired control impulse. Such impulse conduits, however, are, as a rule, long and thin pipes erected in the open air or, probably, an electric line of special reliability the maintenance of which being considerably delicate and cumbersome, especially in periods of danger of frost, viz., under normal conditions, water stagnates in such thin conduits and is exposed to the danger of freezing whatever thick insulation be applied to the conduit proper. Furthermore, the situation is aggravted by that the heat exchangers are, as a rule, subdivided into a plurality of elements or units and are operated in dependence on weather conditions with a corresponding number of such units. Thus, each unit has to be provided with an individual impulse transmitter since any of such units may be operated alone. Thus, not only a plurality of impulse transmitters are necessary but a corresponding number of switch-over devices are to be applied as well so as to ensure that indications given by disconnected heat exchanger units be rendered inoperative and indications of inserted units be duly considered, and that, in a system the destination of which is to warrant a perfectly reliable operation.

Obviously, the problem of adjustment would extremely be simplified by a system which controls the means for adjusting the pressure likewise dependent on the pressure prevailing at the highest geodetic level of the system without, however, requiring for this purpose long impulse conduits erected in the open air and switch-over devices.

The main object of the present invention is to provide such a system. With the system according to the invention, the control impulses for the pressure-adjusting means are taken from two places, one of them being taken directly from the pressure stub of the circulating pump whereas the other one is taken likewise directly from a place upstream the pressure-adjusting means, i.e. the inlet stub of the water turbine or from a pipe section upstream the pressure reducing valve applied instead of the water turbine. Both the circulating pump as well as the water turbine being in a power room directly juxtaposed and, as a rule, arranged on a common shaft, the impulse conduits are not exposed to dangers of frost nor is it of any importance which elements of the heat exchanger are operated.

According to the basic idea of the present invention, the static pressures measured at the aforesaid places can be used for deriving and determining unambiguously the value of the pressure prevailing at the highest geodetic level of the heat exchanger, viz., using heat exchangers the tubes of which are arranged vertically and in one half of such heat exchanger the water flows upwards whereas in the other half a downward flow is taking place, the static pressure at the pressure stub of the circulating pump being $P_1$, the height of the highest geodetic level of the heat exchangers above the common axial line of the pump and the water turbine being $h$, the hydraulic resistance of the whole system being $r$ and the static pressure prevailing immediately upstream the water turbine being $P_2$, the static pressure P prevailing at the highest geodetic level of the heat exchanger can be expressed by the following pair of equations:

$$P+h=r/2=P_1 \qquad (a)$$

and $$P+h-r/2=P_2 \qquad (b)$$

wherefrom $$P_1+P_2=2.(P+h) \qquad (c)$$

Thus, if in knowledge of the geodetic height $h$ a constant value for the pressure P is prescribed, the adjustment has to fulfill the single requirement according to which the value $(P_1+P_2)$ is to be kept constant. Namely, if the amount of circulated water becomes altered, such alteration causes only a change in the value of the resistance $r$. The value $(P_1+P_2)$, however, being independent of the resistance as goes forth from Equation $(c)$, the value P of the desired and prescribed pressure will not be changed if the sum of the static pressures prevailing in the pressure stub of the circulating pump and in the inlet stub of the water turbine, respectively is kept constant. Thus, adjustment has now solely the purpose to keep the sum of the pressures $P_1$ and $P_2$ constant. This means that a pressure integrating device has to be applied for an impulse transmitter, the operation of the pressure adjusting device, i.e. a valve or water turbine being influenced by such integrating device.

The same applies to the case where the aforesaid geodetic and hydraulic conditions are not symmetric with respect to the pressure prevailing at the highest geodetic level. Such asymmetry occurs where e.g. the centre lines of the pump and the water turbine are not at the same level or the hydraulic resistance between the pressure stub of the circulating pump and the highest geodetic point of the heat exchanger is not equal to the resistance between the highest geodetic point of the heat exchanger and the water turbine, viz., be $h_1$ the geodetic level difference between the highest geodetic point of the heat exchanger and the centre line of the pump, $h_2$ the geodetic level difference between the highest geodetic point of the heat exchanger and the centre line of the water turbine, $r_1$ the resistance between the pressure stub of the pump and the highest geodetic point of the heat exchanger, and $r_2$ the resistance between the highest geodetic point of the heat exchanger and the water turbine.

Then, obviously, $$P+h_1+r_1=P_1 \quad (1)$$

and $$P+h_2-r_2=P_2 \quad (2)$$

The proportion of the hydraulic resistances referred to above being $$\varphi=r_2/r_1 \quad (2a)$$

wherefrom $$r_2=\varphi \cdot r_1$$

Both Equations 1 and 2 being added together the result is $$P_1+P_2=2\cdot P+h_1+h_2+(1-\varphi)r_1 \quad (3)$$

Introducing $$2P+h_1+h_2=k_1 \quad (4)$$

obviously, $k_1$ is a constant value since the level differences $h_1$ and $h_2$ are necessarily constant whereas the pressure P has to be kept constant according to a predetermined value. Thus, $$P_1+P_2=k_1+(1-\varphi)r_1 \quad (5)$$

Furthermore, upon introducing $$P+h_1=k_2 \quad (6)$$

Equation 1 assumes the form $$k_2+r_1=P_1 \quad (7)$$

wherefrom finally $$r_1=P_1-k_2 \quad (8)$$

Substituting this value in Equation 5, we get $$P_1+P_2=k_1+(1-\varphi)(P_1-k_2)$$

and ordinated $$P_2+\varphi P_1=k_1-(1-\varphi)k_2 \quad (9)$$

Thus, finally $$P_2+\varphi P_1=\text{const} \quad (10)$$

As can be seen, a control according to the invention is feasible also in the above described asymmetric case without applying special expedients. The difference with respect to symmetric cases consists only in that the control apparatus has now to keep constant the sum of the pressure $P_2$ and of a pressure equal to the pressure $P_1$ multiplied with a factor $\varphi$, rather than the sum of the pressures $P_1$ and $P_2$. The factor $\varphi$, however, does not undergo any change in dependence of alterations in the load and the amount of circulated water, respectively, since the proportion of the resistances of the individual parts is independent of the absolute resistance values. Thus, the factor $\varphi$ once having been ascertained for certain operational conditions, also the control apparatus has to be adjusted to such value of the correcton factor $\varphi$.

Considering Equations 4, 6 and 9, the righthand side of the Equation 10 can be expressed as $$k=2P+h_1+h_2-(1-\varphi)(P+h_1)$$
$$=(1+\varphi)P+h_2+\varphi h_1 \quad (11)$$

Completely symmetrical cases are to be regarded as special ones within the scope of Equation 11 and are characterized by $$h_1=h_2=h$$

and $$\varphi=1$$

so that Equation 11 takes the form $$P_2+P_1=2P+2h=2\cdot(P+h)$$

which is the same as has been originally derived for symmetrical cases.

In the drawings,

FIG. 1 is a diagrammatic elevational view of a first embodiment of the invention.

FIG. 2 is a diagrammatic elevational view of a second embodiment of the invention.

The operational principle of the control apparatus according to the invention for a symmetrical case is illustrated in FIG. 1 wherein water is withdrawn by a pump 3 through a pipe conduit 2 from a mixing condenser 1. The water is supplied through a pipe conduit 4 into one portion 5 of a heat exchanger apparatus and withdrawing therefrom enters a return chamber 6 at the top of the heat exchanger and flows into another portion 7 thereof. The water withdrawing from the latter flows through a pipe conduit 8 and a water turbine 9. It is the inlet cross-sectional area of this water turbine 9 which is adjusted by the control apparatus according to the invention. The water withdrawing from the water turbine 9 flows through a pipe conduit 10 to spray diffusers 11 in the mixing condenser 1 whereby the water cycle is closed. The highest geodetic point of the apparatus is indicated by reference character 12. The pressure P prevailing at this point is to be kept at a desired value which somewhat exceeds the atmospheric pressure. According to the invention, however, the pressure impulse is not derived from this highest geodetic point. Instead, points 13 and 14 are selected for deriving control impulses at the pressure stub of the circulaing pump and the inlet stub of the water turbine, respectively, and provided each with a pressure feeler 15 and 16, respectively, of the type of adjusting an electric resistance proportionally to pressure alterations. Both pressure feelers are connected with an adjusting device or means 17 serving for integrating the resistances as adjusted by them and, by means of an operating device or means 18, causing an adjustment of the inlet cross-sectional area of the water turbine 9 so as to keep the sum of the resistances constant. The constancy of the sum of the resistances means a constancy of the sum of the pressures prevailing at 13 and 14 which, in turn, is equivalent to a constancy of the pressure prevailing at 12 as is in compliance with the basic idea of the present invention.

FIG. 2 shows an exemplified embodiment of the invention where the hydraulic resistances of the pipe conduits and heat exchanger apparatus between 13 and 12 as well as 12 and 14, respectively, are unequal.

In such case, the pressures prevailing at 13 and 14 are integrated by the adjusting device 17 weighted in the proportion of the hydraulic resistances between the pressure feeler 13 and the highest geodetic point 12 of the heat exchanger, and between the latter and the pressure feeler 14 rather than being simply integrated. This weighted sum of resistances is what the adjusting device 17 keeps constant by means of the operating device 18.

Let the hydraulic resistance between the pressure feeler 13 and the point 12 be 2 metres water column and the resistance between the point 12 and the pressure feeler 14 be 1 metre water column at a given flow velocity of water. Then, according to Equation 2a, the factor $\varphi$ has the value ½. Thus, according to Equation 10, the half value of the pressure $P_1$ felt by the pressure feeler 15 has to be integrated with the pressure $P_2$ ascertained by the pressure feeler 16. An alteration of the electric resistance of the pressure feeler 15 by 1 ohm be associated e.g. with a pressure change by 0.1 metre water column whereas an alteration of the resistance of the pressure feeler 16 by 2 ohm be associated with a change of pressure of 0.1 metre water column. Otherwise, the operation of the control apparatus is the same as that of the exemplified embodiment shown in FIG. 1.

The invention has been described in connection with adjusting devices having an electric principle of operation. Obviously, instead of applying electric operational principles it is possible to use any other type of control, such as hydraulic, mechanic and pneumatic adjusting means. The above described control principle as well as its embodiments shown in the figures can be applied also in case of the water turbine 9 being substituted by a pressure reducing valve as is the case particularly with air condensation systems of moderate size. In such cases, the operating device 18 serves for altering the cross-sectional area of the pressure reducing valve, otherwise the operation being like that described in connection with the exemplified embodiments.

What we claim is:

1. Air-cooled condensation apparatus comprising a mixing condenser having an inlet and an outlet, a liquid circulating pump having an inlet connected to the outlet of the mixing condenser and having an outlet and having a pressure stub at said pump outlet, a first pressure feeler coupled to said pressure stub so as to be responsive to pressure changes at said pressure stub, a vertical heat exchanger having a lower end and an upper end and having tubing extending between said ends, said tubing having an inlet and an outlet at the lower end of said heat exchanger, said tubing inlet connected to the outlet of said pump, pressure reducing means having an inlet connected to the outlet of said tubing and having an outlet connected to the inlet of said mixing condenser, the upper end of said heat exchanger being at the highest geodetic level of the apparatus, a second pressure feeler coupled to said pressure reducing means inlet so as to be responsive to pressure changes in said pressure reducing means inlet, means for varying the size of said pressure reducing means inlet so as to vary the pressure therein, and means coupling said pressure feelers and said size varying means and operative to weight and integrate the pressures felt by said pressure feelers proportionally to the respective flow resistances between said pressure feelers and the highest geodetic level of the system and to actuate said size varying means to vary the pressure in said pressure reducing means so as to keep the weighted sum of the pressures felt by said pressure feelers constant.

2. Control apparatus as claimed in claim 1 wherein said pressure reducing means is formed as a water turbine, highest geodetic level of said heat exchanger are equal and the adjusting means is set for a simple integration of the pressures ascertained by said pressure feelers.

3. A control apparatus as claimed in claim 1 wherein said pressure reducing means is formed as a water turbine, the output of said water turbine being connected with the input of said circulating pump so as to use the energy output of said water turbine for driving said circulating pump.

References Cited in the file of this patent

UNITED STATES PATENTS

| 1,790,205 | Farmer | Jan. 27, 1931 |
| 2,356,404 | Heller | Aug. 22, 1944 |
| 2,828,606 | Coar | Apr. 1, 1958 |

FOREIGN PATENTS

| 790,410 | Great Britain | Feb. 12, 1958 |